(12) United States Patent
Itou et al.

(10) Patent No.: US 6,167,695 B1
(45) Date of Patent: Jan. 2, 2001

(54) METHOD AND SYSTEM FOR DIAGNOSING DETERIORATION OF NOX CATALYST

(75) Inventors: Yasuyuki Itou; Hidetoshi Itou; Kouji Ishihara, all of Yokohama (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/248,988

(22) Filed: Feb. 12, 1999

(30) Foreign Application Priority Data

Feb. 12, 1998 (JP) .................................................. 10-029639

(51) Int. Cl.[7] ....................................................... F01N 3/00
(52) U.S. Cl. ............................... 60/274; 60/277; 60/301; 60/276; 73/118.1
(58) Field of Search ............................. 60/277, 301, 276, 60/274; 73/118.1

(56) References Cited

U.S. PATENT DOCUMENTS

| | | | |
|---|---|---|---|
| 5,201,802 | * 4/1993 | Hirota et al. | 60/276 |
| 5,412,946 | * 5/1995 | Oshima et al. | 60/286 |
| 5,426,934 | * 6/1995 | Hunt et al. | 60/276 |
| 5,473,887 | 12/1995 | Takeshima et al. . | |
| 5,617,722 | * 4/1997 | Takaku | 60/277 |
| 5,953,907 | * 9/1999 | Kato et al. | 60/274 |
| 6,012,282 | * 1/2000 | Kato et al. | 60/274 |
| 6,026,640 | * 2/2000 | Kato et al. | 60/274 |

FOREIGN PATENT DOCUMENTS

| | | |
|---|---|---|
| 0 814 248 | 12/1997 | (EP) . |
| 7-208151 | 8/1995 | (JP) . |
| 8-232644 | 9/1996 | (JP) . |

* cited by examiner

*Primary Examiner*—Thomas Denion
*Assistant Examiner*—Thai-Ba Trieu
(74) *Attorney, Agent, or Firm*—Foley & Lardner

(57) ABSTRACT

A system and method for diagnosing deterioration of a nitrogen oxide (NOx) catalyst for an internal combustion engine. An output signal indicative of concentration of nitrogen oxides (NOx) in exhaust gas passing through the NOx catalyst is generated from a NOx sensor. Rates of change in the detected NOx concentration are calculated a plurality of times over a predetermined period of time after an air/fuel ratio becomes less than a stoichiometric air/fuel ratio. A representative value derived from the calculated rates of change in the detected NOx concentration is compared with a predetermined reference value for determining that the NOx catalyst is deteriorated.

21 Claims, 9 Drawing Sheets

FIG.6

|  |  |  |  |  |
|---|---|---|---|---|
| Dr$_{ln}$ |  |  |  | Dr$_{mn}$ |
|  |  | Dr$_{xy}$ |  |  |
|  |  |  |  |  |
| Dr$_{ll}$ |  |  |  | Dr$_{ml}$ |

A/F RATIO λ (vertical axis)

INTAKE AIR AMOUNT Qa ($10^4$ l/h)

FIG.7

α (ppm/s)

| A/F RATIO λ | 1 | 5 | 10 | 15 | 20 |
|---|---|---|---|---|---|
| 2.74 | α$_{ln}$ = 0.5 | 1.0 | 2.0 | 3.0 | α$_{mn}$ = 4.0 |
| 2.05 | 0.6 | 1.2 | α$_{xy}$ = 2.5 | 3.7 | 5.0 |
| 1.37 | 0.7 | 1.5 | 3.0 | 4.5 | 6.0 |
| 1 | α$_{ll}$ = 0.8 | 1.7 | 3.5 | 5.2 | α$_{ml}$ = 7.0 |

INTAKE AIR AMOUNT Qa ($10^4$ l/h)

METHOD AND SYSTEM FOR DIAGNOSING DETERIORATION OF NOX CATALYST

FIELD OF THE INVENTION

This invention relates to method and system for diagnosing deterioration of a catalytic converter of an internal combustion engine, and more specifically to a nitrogen oxide (NOx) catalyst employed in an exhaust gas passage of the engine.

BACKGROUND OF THE INVENTION

There is known a NOx catalyst that is arranged in an exhaust gas passage of an internal combustion engine and adapted to absorb nitrogen oxides (NOx) present in exhaust gas emitted from the engine when the engine is operated in a lean air/fuel (A/F) ratio (excess oxygen), i.e., the lean-burn operation, and discharge the NOx absorbed therein when the engine is operated in a rich A/F ratio (excess fuel). Namely, when an amount of the NOx absorbed in the NOx catalyst reaches a predetermined large value, the engine is temporarily operated for controlling the A/F ratio less than a stoichiometric or theoretical A/F ratio, namely, controlling to a rich side with respect to the stoichiometric A/F ratio. Such the control of the A/F ratio to the rich side is hereinafter referred to as rich spike control of A/F ratio. As a result of the rich spike control of A/F ratio, amounts of hydrocarbons (HC) present as unburned component in the exhaust gas from the engine and carbon monoxide increase and an amount of oxygen present in the exhaust gas decreases. The NOx catalyst discharges the NOx absorbed therein in response to the decrease of oxygen. Then, the NOx discharged is reacted with hydrocarbons (HC) present as unburned component in the exhaust gas and reduced to nitrogen. Thus, the NOx can be removed from the exhaust gas emitted from the engine. Such kind of the NOx catalyst is disclosed in U.S. Pat. No. 5,473,887 issued Dec. 12, 1995 which is incorporated herein by reference.

When the NOx absorbency of such the NOx catalyst is deteriorated, the timing of the rich spike control of A/F ratio is offset or the amount of the unburned HC supplied by the rich spike control of A/F ratio far exceeds that required for reducing the NOx discharged from the catalyst. This is undesirable from the viewpoint of emission control. Therefore, it is required to accurately determine deterioration of the catalyst.

Japanese Patent Application First Publication No. 7-208151 discloses a NOx catalyst deterioration determining device for an internal combustion engine. The device is adapted for determining deterioration of a NOx catalyst in an exhaust system by measuring the time elapsed from a moment the entire amount of the NOx absorbed in the NOx catalyst is discharged therefrom after the rich spike control to a moment the amount of the NOx absorbed reaches a predetermined large value, and comparing the time measured with a reference value to thereby determine that the NOx catalyst is deteriorated if the time measured is less than the reference value.

Japanese Patent Application First Publication No. 8-232644 discloses a NOx catalyst deterioration determining device for an internal combustion engine. The device is adapted for determining deterioration of a NOx catalyst in an exhaust system by measuring a rate of change in the A/F ratio downstream of the NOx catalyst that occurs when the rich spike control of A/F ratio is carried out after the NOx absorbed in the NOx catalyst reaches saturation.

SUMMARY OF THE INVENTION

In the device described in the former conventional art, it is not taken into consideration that a rate of change in concentration of the NOx in the exhaust gas flowing into the catalyst varies depending on the engine operation conditions. Therefore, it seems uncertain that the time measured accurately corresponds to the amount of the NOx absorbed in the catalyst. Assuming that the engine runs in a specific operating range, it is possible to accurately measure the time. However, it is a rare case that the engine operation is kept in the specific range until the absorbed NOx varies from zero to the predetermined large value. Therefore, the determination of the deterioration of the catalyst can be conducted merely at a considerably low frequency.

Meanwhile, it will be possible to determine the deterioration of the NOx catalyst by estimating a rate of change in amount of the NOx absorbed in the catalyst per unit time on the basis of the engine operation condition, calculating a sum of the estimated values of the rate of change to obtain a saturation amount of the NOx absorbed, and comparing the saturation amount of the NOx absorbed with a predetermined reference value. However, the calculated saturation amount of the absorbed NOx contains an error that is accumulation of errors in initially estimated change rates from actual change rates over the entire period of time during which the calculation is made, so that the determination of deterioration of the NOx catalyst cannot be conducted with sufficient accuracy.

In the device described in the latter conventional art, it is required that the NOx catalyst is completely saturated with the NOx before conducting the determination of deterioration of the NOx catalyst. This leads to an undesirable emission condition in which the NOx in the exhaust gas from the engine is permitted to pass through the saturated NOx catalyst without being absorbed therein.

It is an object of the present invention to provide catalyst-deterioration diagnosis capable of determining deterioration of a catalyst in an exhaust system of an internal combustion engine with high accuracy and with a simple arrangement.

According to one aspect of the present invention, there is provided a system for diagnosing deterioration of a nitrogen oxide catalyst coupled to an internal combustion engine, said catalyst being capable of absorbing nitrogen oxides present in exhaust gas emitted from the engine during lean-burn operation and releasing the nitrogen oxides absorbed when an air/fuel ratio is less than a stoichiometric air/fuel ratio, comprising:

a nitrogen oxide sensor arranged downstream of the nitrogen oxide catalyst to detect concentration of the nitrogen oxides in the exhaust gas passing through the nitrogen oxide catalyst and generate a signal indicative of the detected concentration of the nitrogen oxides; and a controller operative, in response to said signal generated from said nitrogen oxide sensor, to calculate a rate of change in the detected concentration of the nitrogen oxides over a predetermined period of time after the air/fuel ratio becomes less than the stoichiometric air/fuel ratio, compare said rate of change in the detected concentration of the nitrogen oxides with a predetermined reference value and determine, in response to the comparison result, that the nitrogen oxide catalyst is deteriorated.

According to further aspect of the present invention, there is provided a system for diagnosing deterioration of a nitrogen oxide catalyst coupled to an internal combustion engine, said catalyst being capable of absorbing nitrogen oxides present in exhaust gas emitted from the engine during lean-burn operation and releasing the nitrogen oxides absorbed when an air/fuel ratio is less than a stoichiometric air/fuel ratio, comprising:

a nitrogen oxide sensor arranged downstream of the nitrogen oxide catalyst to detect concentration of the nitrogen oxides in the exhaust gas passing through the nitrogen oxide catalyst and generate a signal indicative of the detected concentration of the nitrogen oxides; and a controller operative, in response to said signal generated from said nitrogen oxide sensor, to calculate rates of change in the detected concentration of the nitrogen oxides a plurality of times over a predetermined period of time after the air/fuel ratio becomes less than the stoichiometric air/fuel ratio, compare a representative value derived from the calculated rates of change in the detected concentration of the nitrogen oxides with a predetermined reference value and determine, in response to the comparison result, that the nitrogen oxide catalyst is deteriorated.

According to still further aspect of the present invention, there is provided a method of diagnosing deterioration of a nitrogen oxide catalyst coupled to an internal combustion engine, said catalyst being capable of absorbing nitrogen oxides present in exhaust gas emitted from the engine during lean-burn operation and releasing the nitrogen oxides absorbed when an air/fuel ratio is less than a stoichiometric air/fuel ratio, comprising:

detecting concentration of the nitrogen oxides in the exhaust gas passing through the nitrogen oxide catalyst;

calculating rates of change in the detected concentration of the nitrogen oxides a plurality of times over a predetermined period of time after the air/fuel ratio becomes less than the stoichiometric air/fuel ratio; and comparing a representative value derived from the calculated rates of change in the detected concentration of the nitrogen oxides with a predetermined reference value to determine, in response to the comparison result, that the nitrogen oxide catalyst is deteriorated.

BRIEF DESCRIPTION OF THE DRAWINGS

FIG. 6 is a map showing various regions of engine operation condition with respect to an air/fuel (A/F) ratio and an intake air amount;

FIG. 7 is a map showing various predetermined lower limit values of a rate of change in concentration of nitrogen oxides (NOx) detected downstream of a nitrogen oxide (NOx) catalyst, which is mapped with respective to the A/F ratio and the intake air amount;

DETAILED DESCRIPTION OF THE INVENTION

Figure 1:
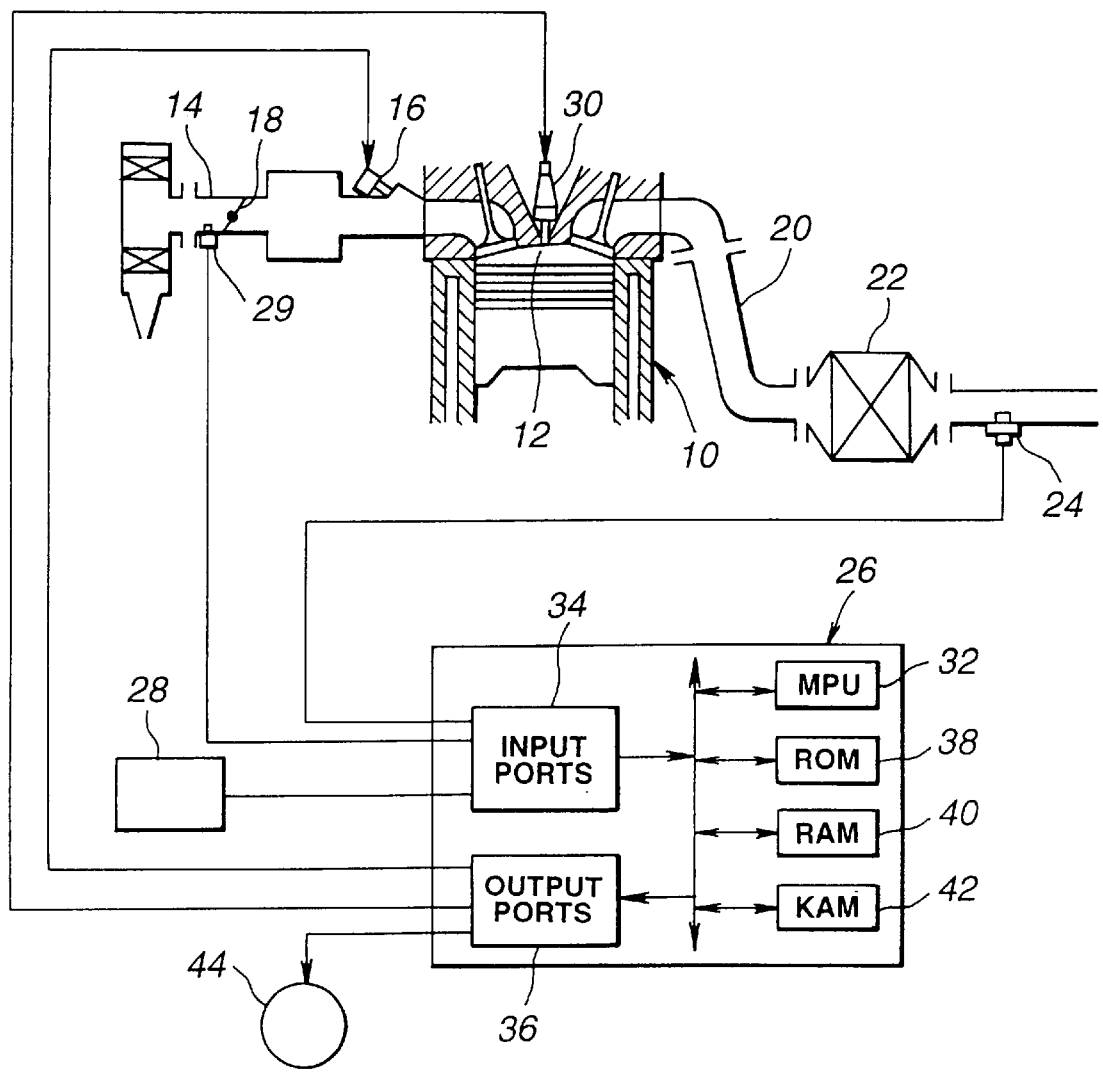
FIG. 1 is a schematic block diagram showing an internal combustion engine to which embodiments according to the present invention are applicable.
Figure 2:
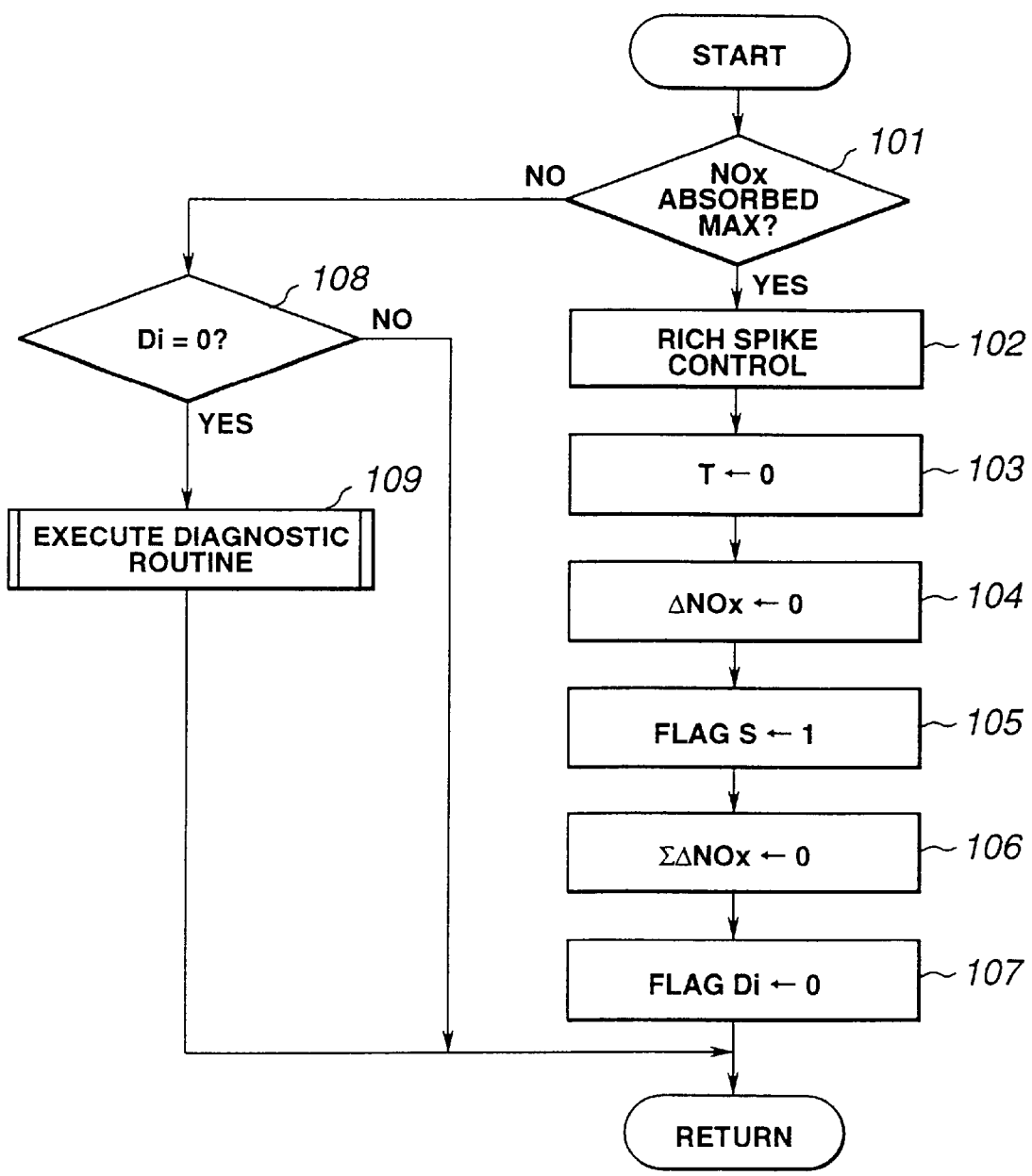
FIG. 2 is a flowchart of an initializing routine for diagnostic parameters used in the first embodiment.
Figure 3:
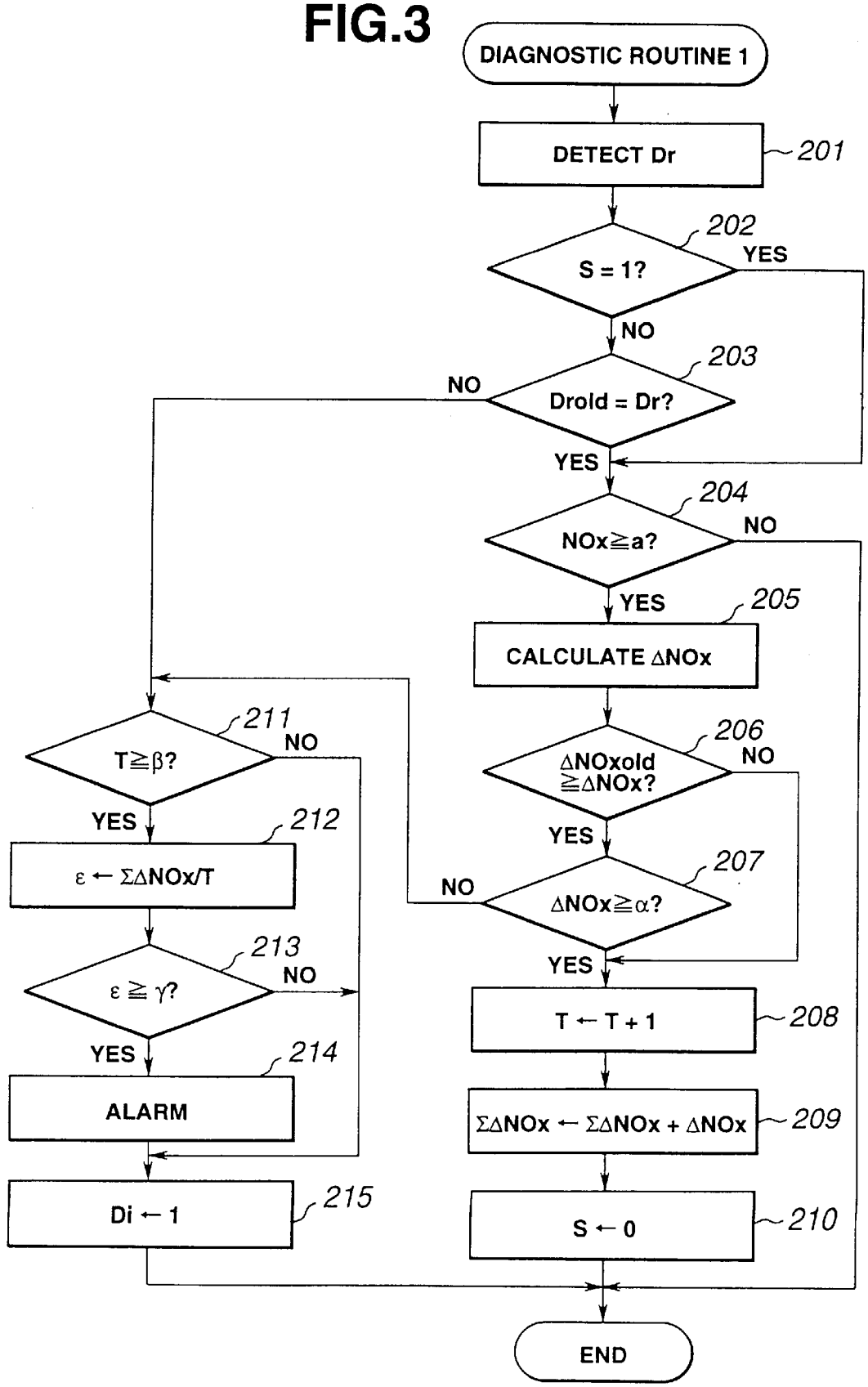
FIG. 3 is a flowchart of a diagnostic routine executed in the first embodiment.

Referring now to FIGS. 1 to 3, the first embodiment of the present invention will be explained.

As illustrated in FIG. 1, an internal combustion engine 10 includes a combustion chamber 12 and an intake air passage 14 connected with the combustion chamber 12. A fuel injection valve 16 is so arranged as to deliver fuel to the combustion chamber 12 through an intake port. A throttle valve 18 is arranged in the intake air passage 14 upstream of the fuel injection valve 16. An exhaust gas passage 20 is connected with the combustion chamber 12. A catalytic converter 22 is arranged in the exhaust gas passage 20. The catalytic converter 22 is formed by a nitrogen oxide (NOx) catalyst adapted to absorb nitrogen oxides (NOx) present in the exhaust gas emitted from the engine 10 during the engine lean-burn operation and discharge the NOx absorbed therein in response to the rich spike control of A/F ratio. A NOx sensor 24 is arranged in the exhaust gas passage 20 downstream of the NOx catalyst 22. The NOx sensor 24 detects concentration of the NOx in the exhaust gas passing through the NOx catalyst 22 and generates a signal indicative of the detected concentration of the NOx. Reference numeral 26 represents a controller receiving various output signals from the NOx sensor 24, an engine speed sensor 28, an intake air flow sensor 29 and the like. The controller 26 operates in response to the output signals received to detect operation conditions of the engine 10 and execute routines illustrated in FIGS. 2 and 3. The controller 26 is formed by a microcomputer including microprocessor unit (MPU) 32, input ports 34, output ports 36, read-only memory (ROM) 38 for storing the control program, random access memory (RAM) 40 for temporary data storage which may also be used for timers or counters, keep-alive memory 42 for storing learned values, and a conventional data bus. The controller 26 develops signals for controlling the fuel injection valve 16 and an ignition plug 30. An alarm 44, for instance an alarm lamp, is actuated by signals from the controller 26 when the controller 26 determines that the NOx catalyst 22 is deteriorated.

FIG. 2 shows an initializing routine including the rich spike control of A/F ratio and initialization of diagnostic test parameters. FIG. 3 shows a diagnostic routine 1 including determining that the NOx catalyst 22 is deteriorated by calculating rates of change ΔNOx of the output signal indicative of the NOx concentration detected, from the NOx sensor 24 a plurality of times over a predetermined period of time after the rich spike control of A/F ratio is conducted, and comparing a representative value ε derived from the calculated rates of change ΔNOx in the detected NOx concentration, with a predetermined reference value γ and determine, in response to the comparison result, that the NOx catalyst 22 is deteriorated. The routines illustrated in FIGS. 2 and 3 are repeatedly executed by the microcomputer at predetermined intervals, for instance, approximately ten milliseconds.

Logic flow goes to a decision block 101 where an interrogation is made whether or not an amount of the NOx absorbed by the NOx catalyst 22 is a maximum value. This decision is made by using history of engine operation conditions, for example engine speed and intake air flow amount, and concentration of the NOx present in the exhaust gas downstream of the NOx catalyst 22 or the like. If the interrogation at the decision block 101 is in affirmative, the rich spike control of A/F ratio is carried out at a block 102. When the rich spike control of A/F ratio is conducted at the block 102, the output signal indicative of the NOx concentration in the exhaust gas, from the NOx sensor 24 abruptly changes in the decreasing direction. This abrupt decrease in the NOx concentration in the exhaust gas is indicated by characteristic curves DAFT and DBEF shown in FIG. 13. The curves DAFT and DBEF indicate the change in the NOx concentration occurring after the rich spike control of A/F ratio is conducted under condition that the NOx catalyst 22 is in deteriorated condition and non-deteriorated condition, respectively.

Subsequently, initialization of the parameters is carried out at blocks 103 to 107. At the block 103, a value T representing time that is measured or counted by a timer or counter in the diagnostic test and used for obtaining the representative value ε of the rates of change ΔNOx in the NOx concentration detected by the NOx sensor 24, is reset at zero. At the block 104, the rates of change ΔNOx are reset at zero. At the block 105, a flag S is reset at one, indicating that the rich spike control of A/F ratio is carried out. When the diagnostic routine 1 is commenced, the flag S is cleared. At the block 106, a sum ΣΔNOx of the rates of change ΔNOx is reset at zero. At the block 107, a flag Di is reset at zero, indicating that the diagnostic test is not yet commenced or that the diagnostic test is proceeding and not yet completed. This also indicates that the rich spike control of A/F ratio is conducted. When the diagnostic test is completed, the flag Di is set at one.

If the interrogation at the decision block 101 is in negative, indicating that the amount of the NOx absorbed is smaller than the maximum value, the logic flow goes to a decision block 108. The negative decision at the decision block 101 represents that the NOx catalyst 22 is recovered to restart absorbing the NOx in the exhaust gas because the NOx absorbed is discharged therefrom by conducting the rich spike control of A/F ratio at the block 102 in the preceding initializing routine.

At the decision block 108, an interrogation is made whether or not the flag Di is reset at zero. If the interrogation at the decision block 108 is in negative, indicating that the flag Di is set at one, the loop of the blocks 101 to 107 is executed before the next commencement of the diagnostic test. If the interrogation at the decision block 108 is in affirmative, indicating that the flag Di is set at zero, the diagnostic routine 1 shown in FIG. 3 is executed at a block 109.

As illustrated in FIG. 3, at the block 201, the engine operation condition Dr under which the engine 10 runs, is detected, for example by using a map illustrated in FIG. 6. The map shows a plurality of predetermined regions of the engine operation condition that are defined by using an intake air amount Qa indicating an amount of an air flow introduced into the engine 10, and an A/F ratio λ at which the engine 10 is operated. The engine operation condition Dr is represented as $Dr_{xy}$, wherein x is a variable for the intake air amount Qa, which is a number from 1 to m, and y is a variable for the A/F ratio λ, which is a number from 1 to n.

Figure 10:
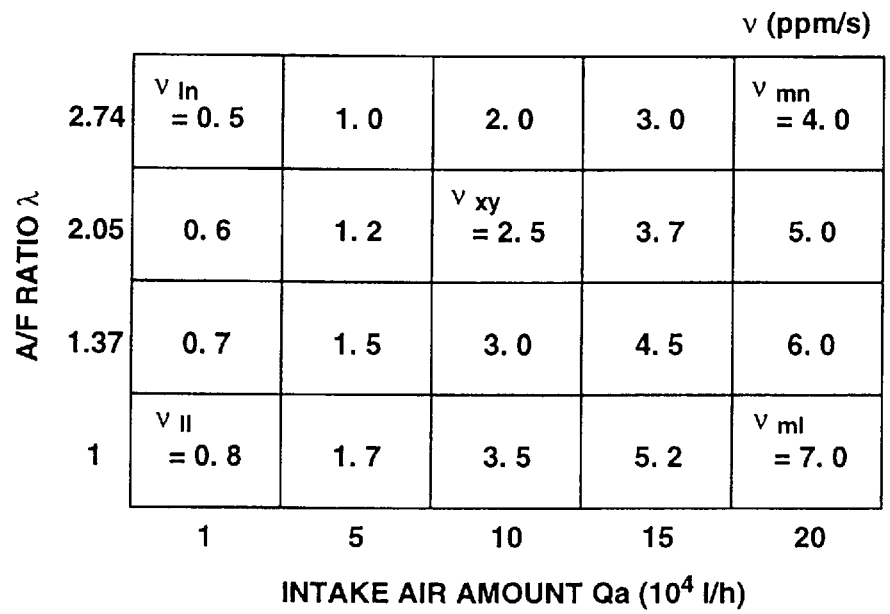
FIG. 10 is a map showing various predetermined initial values of the rate of change in the NOx concentration detected, which is mapped with respect to the A/F ratio and the intake air amount.

Subsequently, at a decision block 202, an interrogation is made whether or not the flag S is set at one. If the interrogation at the decision block 202 is in affirmative, indicating that the rich spike control of A/F ratio has been conducted in the preceding initializing routine shown in FIG. 2, the logic flow proceeds to a decision block 204. At the decision block 204, an interrogation is made whether or not the output signal NOx indicative of the NOx concentration from the NOx sensor 24 is not less than a predetermined initial value a, shown in FIG. 13, of the NOx concentration detected. In this embodiment, the predetermined initial value a is 10 ppm. The interrogation at the decision block 204 may be made whether or not the rate of change ΔNOx in the NOx concentration detected by the NOx sensor 24 is not less than a predetermined initial value ν. The predetermined initial value ν is shown in FIG. 10 and represented as $v_{xy}$ which varies corresponding to the engine operation condition $Dr_{xy}$ shown in FIG. 6.

If the interrogation at the decision block 204 is in affirmative, the rate of change ΔNOx in the detected NOx concentration in the increasing direction is calculated at a block 205. The affirmative decision at the decision block 204 represents that the NOx concentration in the exhaust gas passing through the catalyst 22 exceeds the predetermined initial value a to further increase. If the interrogation at the decision block 204 is in negative, the logic flow goes to the initializing routine shown in FIG. 2.

Figure 11:
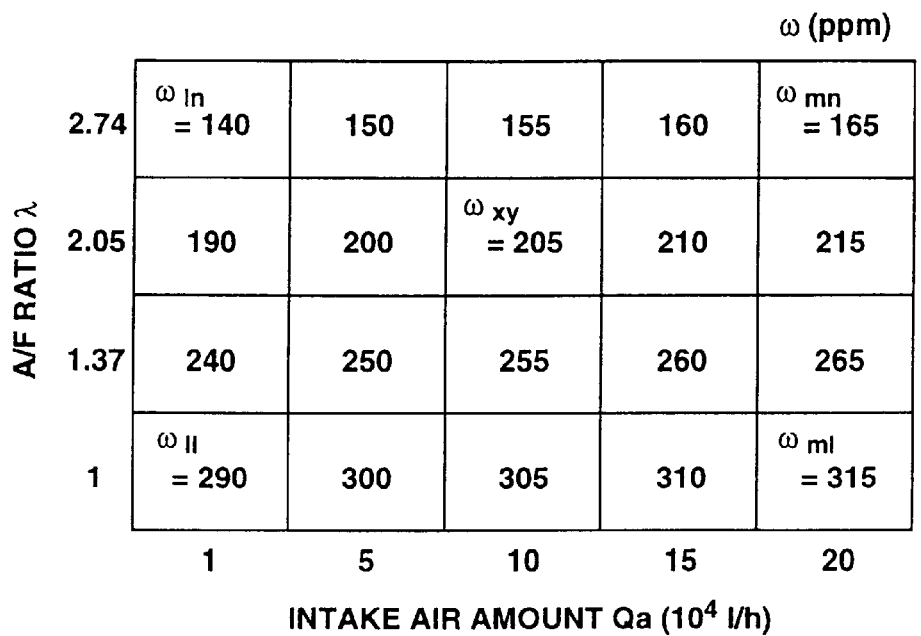
FIG. 11 is a map showing various predetermined terminal values of the NOx concentration, which is mapped with respect to the A/F ratio and the intake air amount.

Next, at a decision block 206, an interrogation is made whether or not the calculated rate of change ΔNOx in the detected NOx concentration is not more than the previously calculated rate of change ΔNOxold in the detected NOx concentration that is obtained in the preceding execution of the diagnostic routine 1. If the interrogation at the decision block 206 is in affirmative, then an interrogation is made at a decision block 207 whether or not the calculated rate of change ΔNOx in the detected NOx concentration is not less than a predetermined terminal value α. The predetermined terminal value α is a predetermined lower limit value of the rate of change ΔNOx in the detected NOx concentration. As shown in FIG. 7, the predetermined terminal value α is represented as $α_{xy}$ which varies corresponding to the engine operation condition $Dr_{xy}$ shown in FIG. 6. The interrogation at the decision block 207 may be made whether or not the NOx concentration detected by the NOx sensor 24 is not more than a predetermined terminal value ω. As shown in FIG. 11, the predetermined terminal value ω may be represented as $ω_{xy}$ which varies corresponding to the engine operation condition $Dr_{xy}$ shown in FIG. 6.

If the interrogation at the decision block 207 is in affirmative, the value T is updated by adding an increment one thereto at a block 208. The affirmative decision at the decision block 207 represents that the NOx concentration in the exhaust gas passing through the NOx catalyst 22 continues to increase at substantially a constant rate that is larger than the predetermined lower limit value α. The value T represents a number of sampling of the rate of change ΔNOx in the NOx concentration detected. Subsequently, at a block 209, the sum ΣΔNOx of the calculated rates of change ΔNOx in the detected NOx concentration is obtained by adding the calculated rate of change ΔNOx in the detected NOx concentration to the previously calculated sum ΣΔNOx obtained in the preceding execution of this diagnostic routine. Then, the flag S is cleared at a block 210 and the logic flow returns to the initializing routine shown in FIG. 2.

If the interrogation at the decision block 207 is in negative, the logic flow goes to a decision block 211. The negative decision at the decision block 207 indicates that the calculated rate of change ΔNOx in the detected NOx concentration is not more than the previously calculated rate of change ΔNOxold in the detected NOx concentration and is less than the predetermined terminal value α. The negative decision at the decision block 207 represents that the amount of the NOx absorbed in the NOx catalyst 22 becomes much closer to the saturation value and that the calculated rate of change ΔNOx in the detected NOx concentration begins to decrease. The decrease of the calculated rate of change ΔNOx is indicated at a point b of the characteristic curve DAFT shown in FIG. 13.

Figure 8:
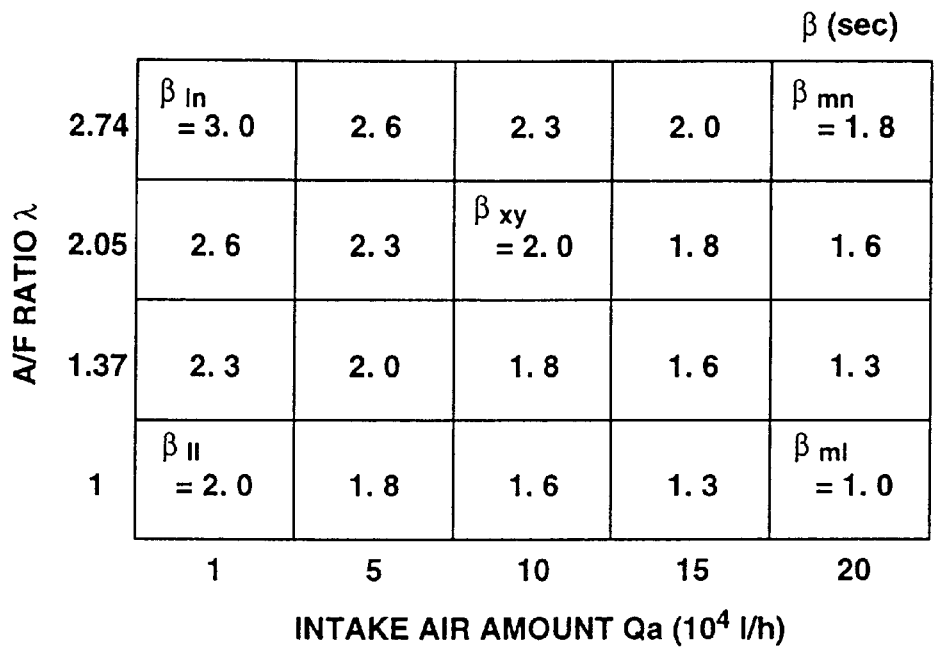
FIG. 8 is a map showing various predetermined periods of time measured upon calculating a representative value of the rates of change in the NOx concentration detected, which is mapped with respective to the A/F ratio and the intake air amount.

At the decision block 211, an interrogation is made whether or not the value T measured is not less than a predetermined value β. The predetermined value β represents a predetermined period of time from a moment the detected NOx concentration becomes not less than the predetermined initial value a or the calculated rate of change ΔNOx in the detected NOx concentration becomes not less than the predetermined initial value ν, to a moment the calculated rate of change ΔNOx in the detected NOx concentration becomes less than the predetermined terminal value α or the detected NOx concentration exceeds the predetermined terminal value ω. The predetermined value β is shown in FIG. 8 and represented as $\beta_{xy}$ which varies corresponding to the engine operation condition $Dr_{xy}$ shown in FIG. 6.

Figure 9:
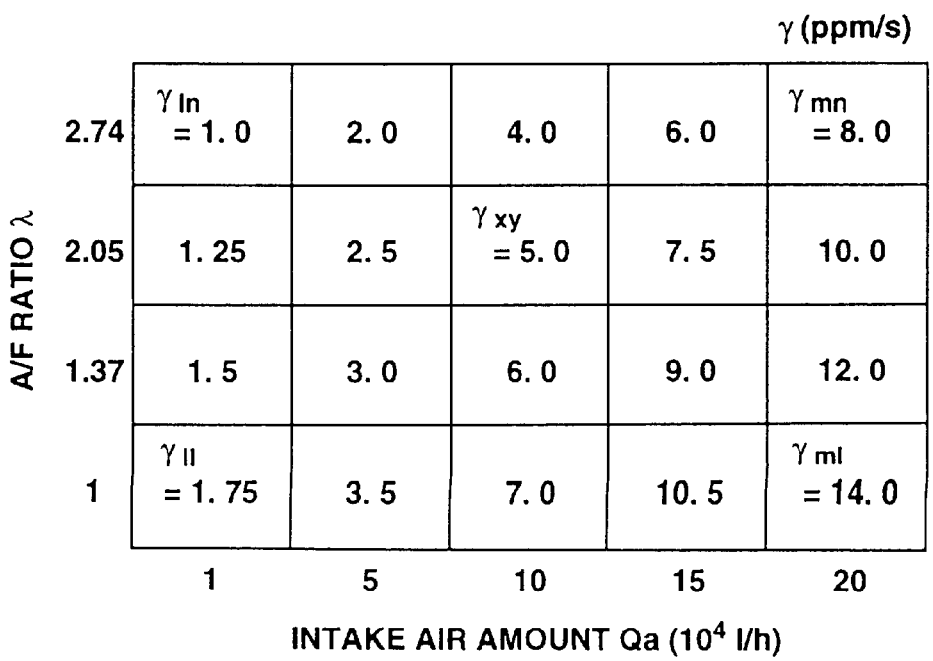
FIG. 9 is a map showing various predetermined reference values for determining the deterioration of the NOx catalyst, which is mapped with respective to the A/F ratio and the intake air amount.

If the interrogation at the decision block 211 is in affirmative, indicating that the value T measured is not less than the predetermined value β, an average of the calculated rates of change ΔNOx in the detected NOx concentration during the diagnostic period of time is calculated as the representative value ε at a block 212. Namely, the representative value ε is obtained by dividing the sum ΣΔNOx of the calculated rates of change ΔNOx in the detected NOx concentration by the value T measured. Subsequently, at a decision block 213, an interrogation is made whether or not the obtained representative value ε is not less than the predetermined reference value γ. The predetermined reference value γ is shown in FIG. 9 and represented as $\gamma_{xy}$ which varies corresponding to the engine operation condition $Dr_{xy}$ shown in FIG. 6. If the interrogation at the decision block 213 results in affirmative, it is determined that the NOx catalyst 22 is deteriorated and the logic flow goes to a block 214. At the block 214, the alarm 44 is actuated to inform an operator of the vehicle that the NOx catalyst 22 is deteriorated. Then, the logic flow proceeds to a block 215 where the flag Di is set at one, indicating that the diagnostic test is completed.

If the interrogation at the decision block 202 is in negative in the repeated execution of the diagnostic routine 1, then the logic flow goes to a decision block 203. The negative decision at the decision block 202 represents that the flag S is cleared in the preceding execution of this routine.

At the decision block 203, an interrogation is made whether or not the engine operation condition Dr detected is equal to the previously detected engine operation condition Drold. If the interrogation at the decision block 203 is in affirmative, the logic flow proceeds to the decision block 204. If the interrogation at the decision block 203 is in negative, the logic flow goes to the decision block 211. The negative decision at the decision block 203 represents that the engine operation condition Dr detected shifts from the previously detected engine operation condition Drold.

If the interrogation at the decision block 206 is in negative, indicating that the calculated rate of change ΔNOx in the detected NOx concentration is more than the previously calculated rate of change ΔNOx in the detected NOx concentration, then the logic flow proceeds to the blocks 208 to 210. The negative decision at the decision block 206 represents that the NOx concentration in the exhaust gas passing through the NOx catalyst 22 increases at substantially the constant rate.

If the interrogation at the decision block 211 is in negative, the logic flow goes to the block 215.

If the interrogation at the decision block 213 is in negative, indicating that the representative value ε, i.e. the average of the calculated rates of change ΔNOx in the detected NOx concentration, is less than the predetermined reference value γ, the logic flow goes to the block 215.

Figure 4:
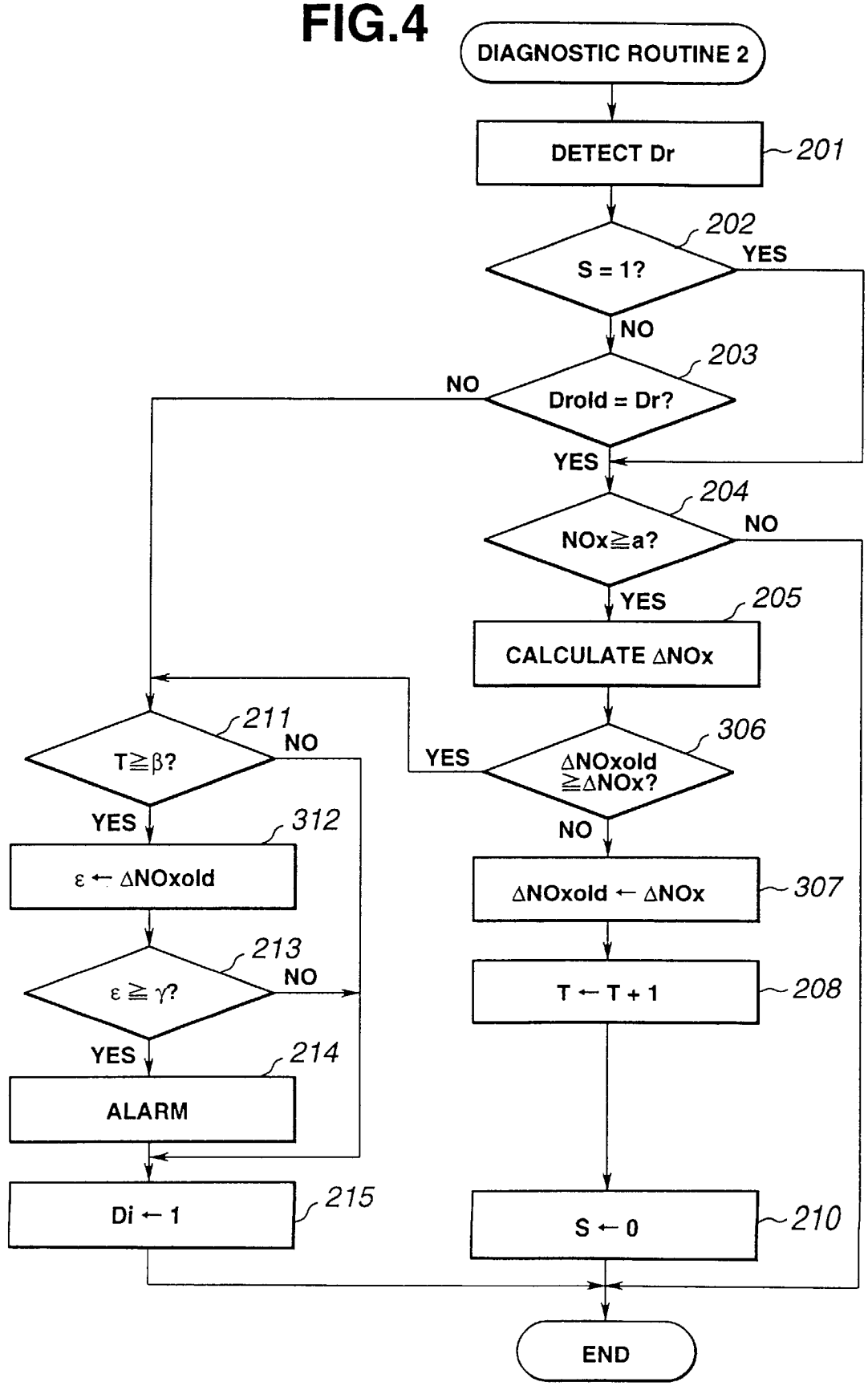
FIG. 4 is a flowchart of a diagnostic routine executed in the second embodiment.

Referring to FIG. 4, the second embodiment of the present invention is explained hereinbelow, which differs from the above-described first embodiment in that a diagnostic routine 2 is executed at the block 109 shown in FIG. 2. The diagnostic routine 2 is similar to the diagnostic routine 1 of the first embodiment, except that the calculated rate of change ΔNOx in the detected NOx concentration at an inflection point of the characteristic curve thereof is used as the representative value ε. Like reference numerals denote like parts and therefore detailed explanations therefor are omitted.

As illustrated in FIG. 4, at a decision block 306, an interrogation is made whether or not the calculated rate of change ΔNOx in the detected NOx concentration is not more than a maximum value among the previously calculated rates of change ΔNOxold in the detected NOx concentration. If the interrogation at the decision block 306 results in affirmative, the logic flow goes to the decision block 211. The affirmative decision at the decision block 306 represents that the calculated rate of change ΔNOx in the detected NOx concentration reaches the maximum value and then begins to decrease. The maximum value lies at the inflection point c of the characteristic curve DAFT shown in FIG. 13.

If the interrogation at the decision block 211 results in affirmative, the maximum value among the previously calculated rates of change ΔNOxold in the detected NOx concentration is substituted for the representative value ε at a block 312. Then, the logic flow proceeds to the decision block 213 where the representative value ε is compared with the predetermined reference value γ.

If the interrogation at the decision block 306 results in negative, representing that the calculated rate of change ΔNOx in the detected NOx concentration increases, the logic flow goes to a block 307. At the block 307, the previously calculated rate of change ΔNOxold in the detected NOx concentration is updated by substituting the calculated rate of change ΔNOx therefor. The logic flow then goes to the blocks 208 and 210.

Figure 5:
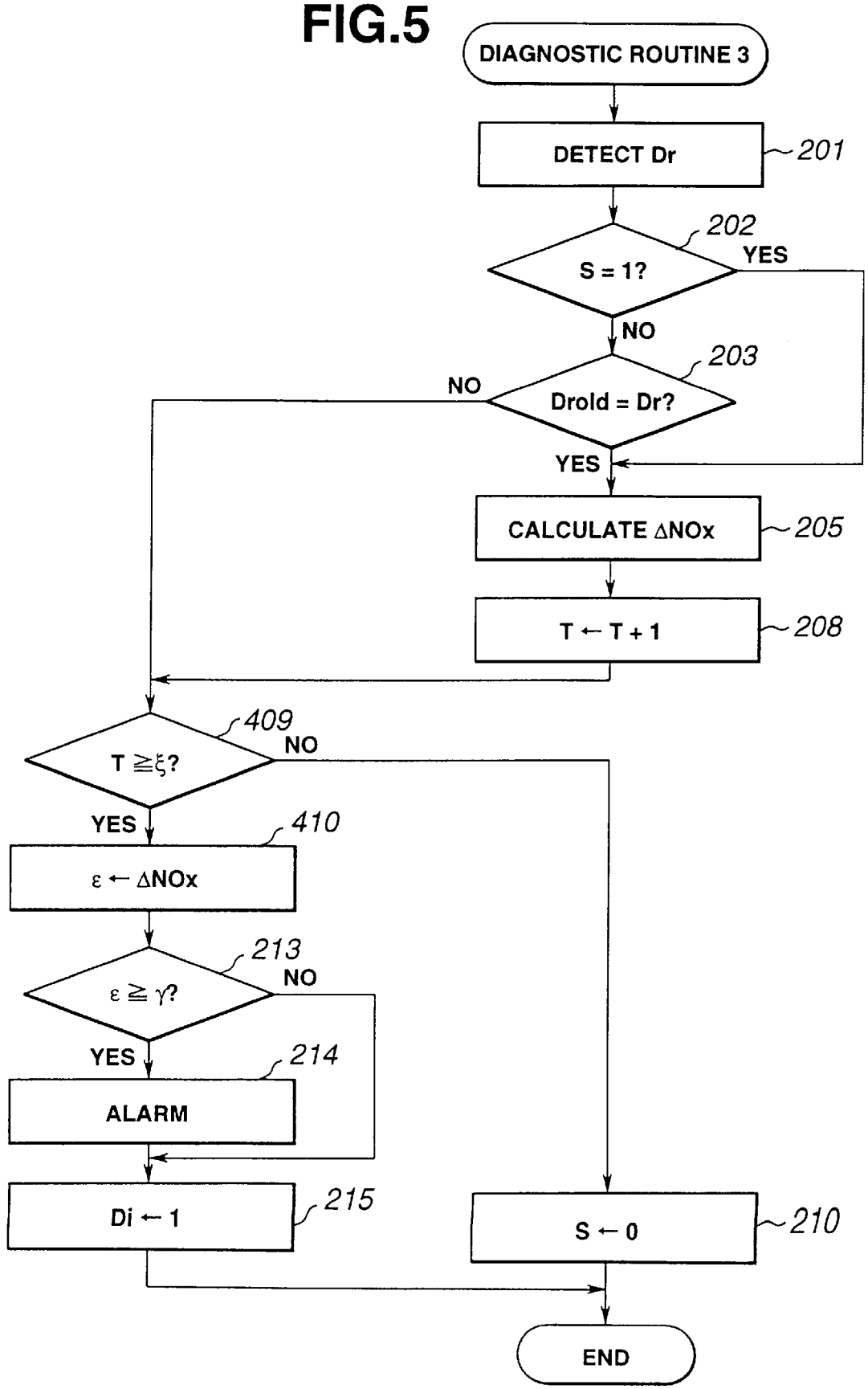
FIG. 5 is a flowchart of a diagnostic routine executed in the third embodiment.

Referring to FIG. 5, the third embodiment of the present invention is explained hereinbelow. The third embodiment differs from the above-described first embodiment in that a diagnostic routine 3 is executed at the block 109 shown in FIG. 2. The diagnostic routine 3 is similar to the diagnostic routine 1 of the first embodiment, except that, when time T elapsed from a moment the rich spike control of A/F ratio is carried out becomes not less than a predetermined value ξ, the calculated rate of change ΔNOx in the detected NOx concentration is used as the representative value ε. Like reference numerals denote like parts and therefore detailed explanations therefor are omitted.

Figure 12:
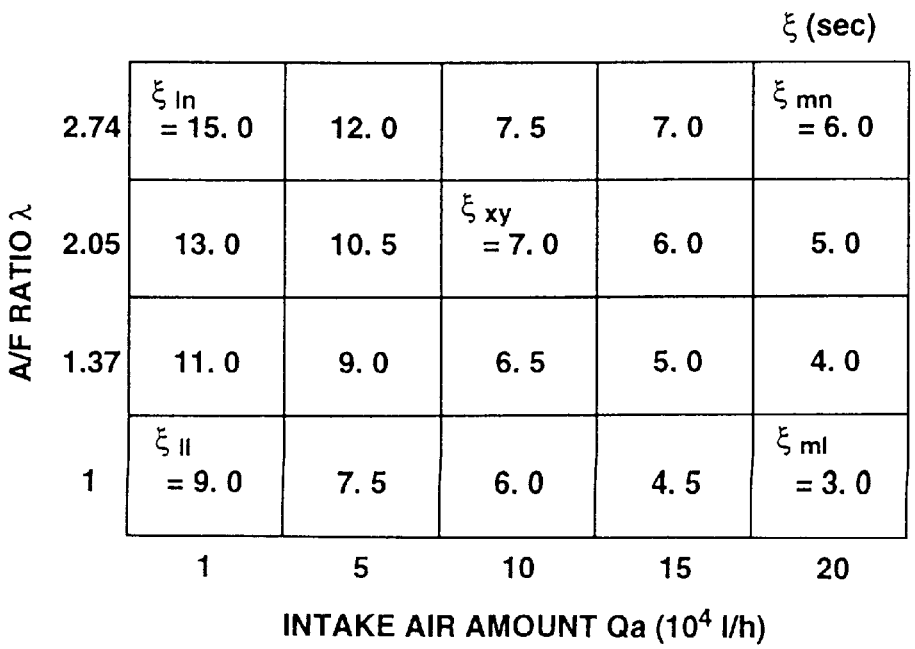
FIG. 12 is a map showing various predetermined times elapsed from a moment a rich spike control is carried out, which is mapped with respective to the A/F ratio and the intake air amount.

The loop of the blocks 205 and 208 is executed and then at a decision block 409 an interrogation is made whether or not the value T of time measured from the moment the rich spike control of A/F ratio is conducted becomes not less than the predetermined value ξ. The predetermined value ξ represents a predetermined time elapsed from the moment the rich spike control of A/F ratio is conducted. The predetermined value ξ is shown in FIG. 12 and represented as $\xi_{xy}$ which varies corresponding to the engine operation condition $Dr_{xy}$ shown in FIG. 6. If the interrogation at the decision block 409 is in affirmative, the calculated rate of change ΔNOx in the detected NOx concentration that is obtained at the preceding block 205 is substituted for the representative value ε at a block 410. The logic flow then goes to the decision block 213 where the representative value ε is compared with the predetermined reference value γ. If the interrogation at the decision block 409 is in negative, then the logic flow goes to the block 210.

Figure 13:
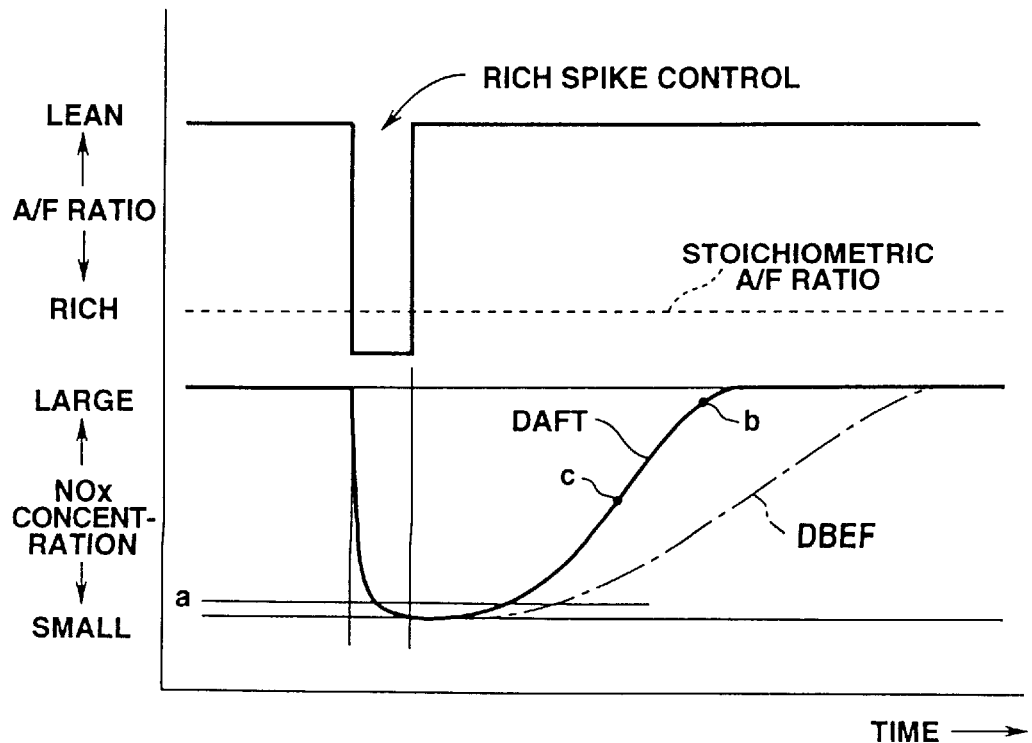
FIG. 13 is a diagram showing changes in the NOx concentration that occur after rich spike control is carried out when the NOx catalyst is in deteriorated and non-deteriorated conditions.

As be appreciated from the above description, the diagnostic system for the NOx catalyst determines deterioration of the NOx catalyst by using calculation results of the rates of change in the NOx concentration detected downstream of the NOx catalyst, in view of the characteristic of the NOx catalyst as seen from FIG. 13. As an amount of the NOx absorbed in the NOx catalyst becomes closer to the saturation value, an amount of the NOx entering the NOx catalyst and passing therethrough without being absorbed therein increases gradually. When the NOx catalyst reaches the saturated level, the whole amount of the NOx entering the NOx catalyst passes therethrough. It will be understood from FIG. 13 that, when the NOx catalyst is deteriorated, the rate of increase in the NOx amount passing through the NOx catalyst becomes higher.

Since the calculated rate of change in the detected NOx concentration varies depending on the engine operation condition, the diagnostic system of the invention determines deterioration of the NOx catalyst by considering the engine operation condition. Namely, the predetermined reference value for determining deterioration of the NOx catalyst is given corresponding to the engine operation condition, as described in the above embodiments.

Further, in the diagnostic system of the invention, the rates of change in the detected NOx concentration are calculated over the predetermined period of time that expires before the saturation. This is desirable in exhaust emission.

Even if there is an error in the predetermined reference value from the representative value derived from the calculated rates of change in the detected NOx concentration, the error is caused corresponding to the predetermined period of time over which the rates of change in the detected NOx concentration are calculated and does not cause considerable influence on accuracy of the determination of deterioration of the NOx catalyst.

Further, in the predetermined period of time used for calculation of the rates of change in the detected NOx concentration, the detected NOx concentration increases at substantially a constant rate as shown in the curve DAFT of FIG. 13. The increase at substantially the constant rate corresponds to the deteriorated condition of the NOx catalyst. Accordingly, accurate diagnosis of deterioration of the NOx catalyst can be achieved.

Furthermore, since the average of the calculated rates of change in the detected NOx concentration is used as explained in the first embodiment of the invention, it is possible to reduce influence of disturbance occurring upon the detection of the NOx concentration.

Additionally, as explained in the second embodiment of the invention, the calculated rate of change in the detected NOx concentration at the inflection point of the characteristic curve of change in the detected NOx concentration is of the maximum value. It will note that the calculated rate of change in the detected NOx concentration begins to decrease immediately after the inflection point. This represents that the calculated rate of change in the detected NOx concentration varies corresponding to degree of deterioration of the NOx catalyst. Since the calculated rate of change in the detected NOx concentration at the inflection point is used as the representative value, it is possible to determine deterioration of the NOx catalyst with increased accuracy and less influence of error.

Further, as explained in the third embodiment of the invention, the predetermined time elapsed from the moment the rich spike control of A/F ratio is carried out, is used as the predetermined period of time for calculation of the rates of increase in the detected NOx concentration. This contributes to easy and simple diagnosis of deterioration of the NOx catalyst.

The contents of Japanese Patent Application No. P10-29639 filed on Feb. 12, 1998, is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A system for diagnosing deterioration of a nitrogen oxide catalyst coupled to an internal combustion engine, said catalyst being capable of absorbing nitrogen oxides present in exhaust gas emitted from the engine during lean-burn operation and releasing the nitrogen oxides absorbed when an air/fuel ratio is less than a stoichiometric air/fuel ratio, comprising:

a nitrogen oxide sensor arranged downstream of the nitrogen oxide catalyst to detect concentration of the nitrogen oxides in the exhaust gas passing through the nitrogen oxide catalyst and generate a signal indicative of the detected concentration of the nitrogen oxides; and a controller operative, in response to said signal generated from said nitrogen oxide sensor, to calculate a rate of change in the detected concentration of the nitrogen oxides at any point in time during a predetermined period after the air/fuel ratio becomes less than the stoichiometric air/fuel ratio, compare said rate of change in the detected concentration of the nitrogen oxides with a predetermined reference value and determine, in response to the comparison result, that the nitrogen oxide catalyst is deteriorated.

2. A system as claimed in claim 1, wherein said predetermined period of time includes a period of time in which the detected concentration of the nitrogen oxides varies at substantially a constant rate in an increasing direction.

3. A system as claimed in claim 1, wherein said predetermined period starts after a predetermined time has elapsed from a moment the air/fuel ratio becomes less than the stoichiometric air/fuel ratio.

4. A system as claimed in claim 1, wherein said predetermined reference value is determined based on operation condition of the internal combustion engine.

5. A system as claimed in claim 1, wherein said predetermined period of time is determined based on operation condition of the internal combustion engine.

6. The system as claimed in claim 1, wherein said controller calculates the rate of change by using nitrogen oxide concentration signals from only the nitrogen oxide sensor arranged downstream of the nitrogen oxide catalyst.

7. A system for diagnosing deterioration of a nitrogen oxide catalyst coupled to an internal combustion engine, said catalyst being capable of absorbing nitrogen oxides present in exhaust gas emitted from the engine during lean-burn operation and releasing the nitrogen oxides absorbed when an air/fuel ratio is less than a stoichiometric air/fuel ratio, comprising:

a nitrogen oxide sensor arranged downstream of the nitrogen oxide catalyst to detect concentration of the nitrogen oxides in the exhaust gas passing through the nitrogen oxide catalyst and generate a signal indicative of the detected concentration of the nitrogen oxides; and a controller operative, in response to said signal generated from said nitrogen oxide sensor, to calculate rates of change in the detected concentration of the nitrogen oxides a plurality of times at any points in time during a predetermined period after the air/fuel ratio becomes less than the stoichiometric air/fuel ratio, compare a representative value derived from the calculated rates of change in the detected concentration of the nitrogen oxides with a predetermined reference value and determine, in response to the comparison result, that the nitrogen oxide catalyst is deteriorated.

8. A system as claimed in claim 7, wherein said predetermined period of time includes a period of time from a moment one of the calculated rates of change in the detected concentration of the nitrogen oxides becomes not less than a predetermined initial value or the detected concentration of the nitrogen oxides becomes not less than a predetermined initial value, to a moment one of the calculated rates of change in the detected concentration of the nitrogen oxides becomes less than a predetermined terminal value or the detected concentration of the nitrogen oxides exceeds a predetermined terminal value.

9. A system as claimed in claim 7, wherein said representative value includes an average of the calculated rates of change in the detected concentration of the nitrogen oxides.

10. A system as claimed in claim 7, wherein said representative value includes the calculated rate of change in the detected concentration of the nitrogen oxides at an inflection point of a characteristic curve thereof.

11. The system as claimed in claim 7, wherein said controller calculates rates of change by using nitrogen oxide concentration signals from only the nitrogen oxide sensor arranged downstream of the nitrogen oxide catalyst.

12. A method of diagnosing deterioration of a nitrogen oxide catalyst coupled to an internal combustion engine, said catalyst being capable of absorbing nitrogen oxides present in exhaust gas emitted from the engine during lean-burn operation and releasing the nitrogen oxides absorbed when an air/fuel ratio is less than a stoichiometric air/fuel ratio, comprising:

detecting concentration of the nitrogen oxides in the exhaust gas passing through the nitrogen oxide catalyst;

calculating rates of change in the detected concentration of the nitrogen oxides a plurality of times at any points in time during a predetermined period after the air/fuel ratio becomes less than the stoichiometric air/fuel ratio; and comparing a representative value derived from the calculated rates of change in the detected concentration of the nitrogen oxides with a predetermined reference value to determine, in response to the comparison result, that the nitrogen oxide catalyst is deteriorated.

13. A method as claimed in claim 12, wherein said predetermined period of time includes a period of time in which the detected concentration of the nitrogen oxides varies at substantially a constant rate in an increasing direction.

14. A method as claimed in claim 12, wherein said predetermined period of time includes a period of time from a moment one of the calculated rates of change in the detected concentration of the nitrogen oxides becomes not less than a predetermined initial value or the detected concentration of the nitrogen oxides becomes not less than a predetermined initial value, to a moment one of the calculated rates of change in the detected concentration of the nitrogen oxides becomes less than a predetermined terminal value or the detected concentration of the nitrogen oxides exceeds a predetermined terminal value.

15. A method as claimed in claim 12, wherein said representative value includes an average of the calculated rates of change in the detected concentration of the nitrogen oxides.

16. A method as claimed in claim 12, wherein said representative value includes the calculated rate of change in the detected concentration of the nitrogen oxides at an inflection point of a characteristic curve thereof.

17. A method as claimed in claim 12, wherein said predetermined period starts after a predetermined time has elapsed from a moment the air/fuel ratio becomes less than the stoichiometric air/fuel ratio.

18. A method as claimed in claim 12, wherein said predetermined reference value is determined based on operation condition of the internal combustion engine.

19. A method as claimed in claim 12, wherein said predetermined period of time is determined based on operation condition of the internal combustion engine.

20. A method as claimed in claim 12, further comprising determining whether or not operation condition of the internal combustion engine is changed.

21. The method according to claim 12, wherein the step of detecting concentration of the nitrogen oxides is only performed downstream of the nitrogen oxide catalyst.

* * * * *